W. R. BIRT, Jr.
MUD GUARD FOR CYCLES, MOTOR CYCLES, AND VEHICLES.
APPLICATION FILED NOV. 3, 1911.
1,034,066.
Patented July 30, 1912.
3 SHEETS—SHEET 1.
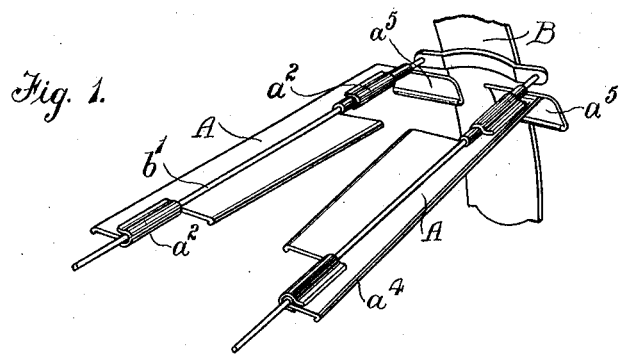
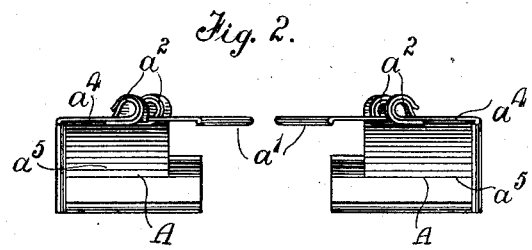
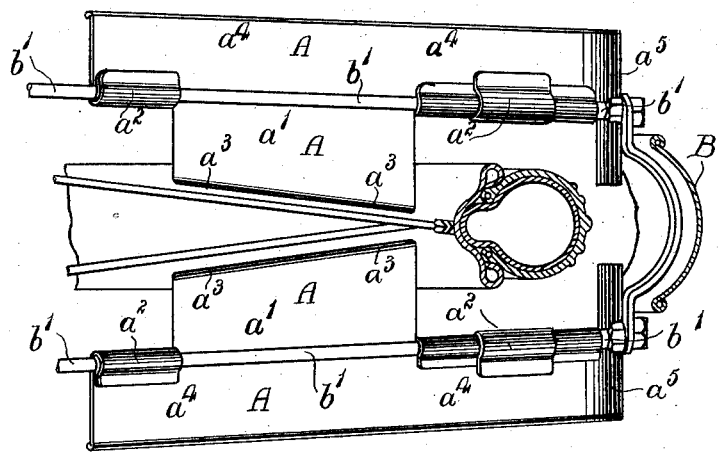
WITNESSES
INVENTOR
WILLIAM RADCLIFF BIRT, Junior
Attorney W. R. BIRT, Jr.
MUD GUARD FOR CYCLES, MOTOR CYCLES, AND VEHICLES.
APPLICATION FILED NOV. 3, 1911.

1,034,066.

Patented July 30, 1912.

3 SHEETS—SHEET 2.

WITNESSES
John H. Hoving
F. H. Logan

INVENTOR
WILLIAM RADCLIFF BIRT, Junior
By H. van Dedemuel
Attorney

W. R. BIRT, Jr.
MUD GUARD FOR CYCLES, MOTOR CYCLES, AND VEHICLES.
APPLICATION FILED NOV. 3, 1911.
1,034,066.
Patented July 30, 1912.
3 SHEETS—SHEET 3.
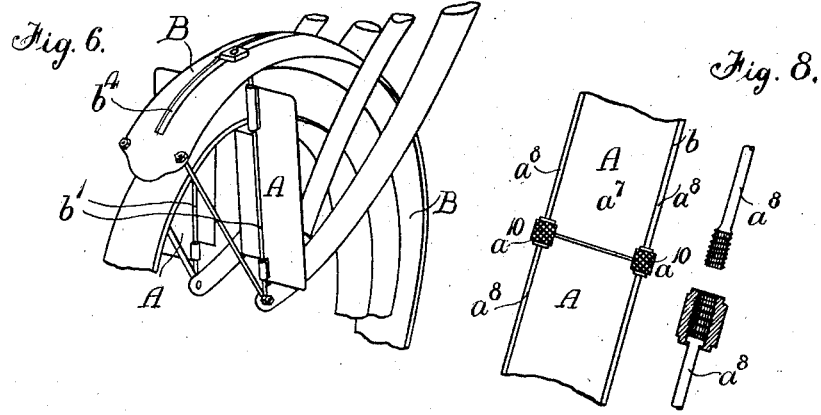
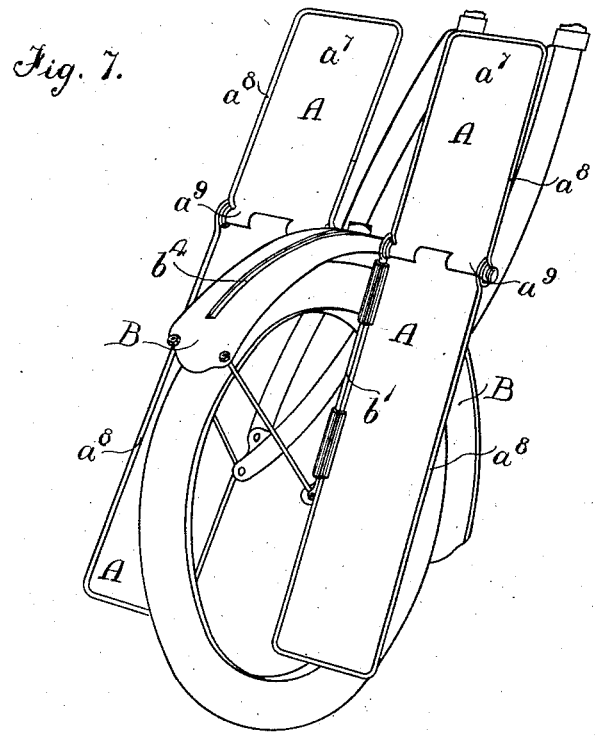
WITNESSES
INVENTOR
WILLIAM RADCLIFF BIRT, Junior
Attorney

UNITED STATES PATENT OFFICE.

WILLIAM RADCLIFF BIRT, JR., OF WYLDE GREEN, NEAR BIRMINGHAM, ENGLAND.

MUD-GUARD FOR CYCLES, MOTOR-CYCLES, AND VEHICLES.

1,034,066.	Specification of Letters Patent.	Patented July 30, 1912.

Application filed November 3, 1911. Serial No. 658,356.

*To all whom it may concern:*

Be it known that I, WILLIAM RADCLIFF BIRT, Jr., subject of the King of Great Britain, residing at West Lodge, Western Road, Wylde Green, near Birmingham, in the county of Warwick, England, have invented a new and useful Improvement in Mud-Guards for Cycles, Motor-Cycles, and Vehicles; and I do hereby declare the following to be a full, clear, and exact description of the same.

This invention comprises improvements relating to mudguards for cycles, motor cycles and vehicles.

In accordance with my invention I provide auxiliary guards or shields in the form of strips for protecting the spaces at the sides of the wheel either inside or outside the usual stays, which support the ordinary guards and these strips or guards are disposed in a plane at right angles to that of the wheel and more or less radial in respect to the wheel and are pivotally mounted upon stays so as to be capable of being turned into or out of operative position as desired.

The strips may be mounted on the usual stays or on additional stays and attached to the forks, carrier struts or other convenient parts so long as they are pivotal on such stays.

It has been before proposed to arrange a trough mudguard in two circumferential sections fastened to a rigid stay piece, the sections being parallel to the plane of the wheel and capable of hinging upon the stays so as to open away from the wheel to permit their inner surfaces to be cleaned. My invention is distinct from such an arrangement as my auxiliary guards are so pivoted that they may be turned into or out of operative position without undoing any fastening device and without any detachment or partial detachment. Further it has been proposed to use an auxiliary mudguard disposed in a plane at right angles to that of the wheel and mounted upon one of the stays of the ordinary mudguard but such mudguard was fixed and not pivotal.

Figure 4:
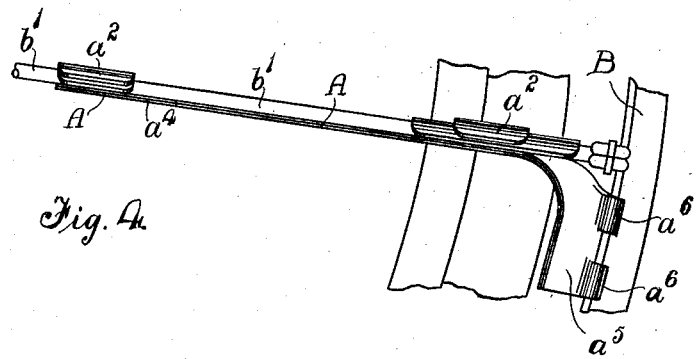
Figure 5:
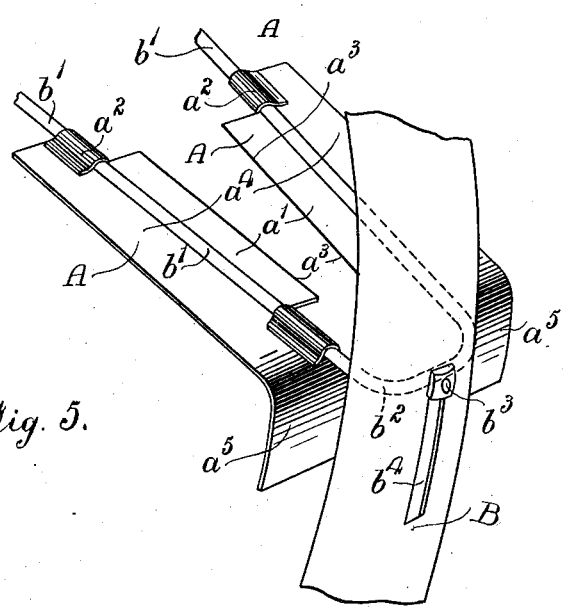

Referring to the drawings:—Figure 1. is a perspective view with the auxiliary strips in position. Fig. 2. is a front end view of my protecting strips or guards detached from the stays but represented in the position they occupy when in use. Fig. 3. is a plan of my auxiliary guards in position. Fig. 4. is an elevation of my guards with enlarged outside portions. Fig. 5. is a perspective view of my guards mounted on movable stays so that they may be raised or lowered. Fig. 6. is a perspective view of a motor cycle mudguard with adjustable auxiliary guards on the stays of the front extension. Fig. 7. shows a further modification. Fig. 8. is a detail of a modification.

In the example illustrated by Figs. 1, 2 and 3 I mount a guard A on each stay $b^1$ of the ordinary mudguard B. Each of the guards A comprises a flat portion cut from a sheet of metal, celluloid or other material, or a structure covered with a material to present an inner projecting portion $a^1$. On each side of the portion $a^1$ the material may be turned over to form spring clips $a^2$; or such clips are secured at such parts to embrace a stay or stays in a manner allowing the guard to be turned, or pivoted upon the stay so that it may be turned into a position for use and out of same when desired. The portion $a^1$ is preferably cut so that its edge $a^3$ is inclined to follow approximately the plane the spokes of the wheel occupy in rotation; this will be clearly seen in Fig. 3. The portion $a^1$ is further arranged in relation to the mounting and to the outwardly projecting part $a^4$ so that when in position on the stay and the part $a^4$ is against the ordinary mudguard a space is left at the side of $a^1$ to clear the rim and tire.

The example here shown presents the inwardly projecting portion $a^1$ which protects the space between the stays and the rim of the wheel, and also the outwardly projecting portion $a^4$. These portions are arranged substantially at right angle to the vertical plane in which the wheel rotates and may be either on the lower stays $b^1$ as shown or on stays from a front extension of the ordinary guard.

I need not employ both the parts $a^1$ and $a^4$ but may use one side projection only if desired, so long as the guards are pivotally mounted upon the stay or stays.

I have here shown the guards with the rear of the portion $a^4$ extended and bent down as at $a^5$ which form guards projecting on each side of the mudguard. These portions $a^5$ may be continued down to present a considerable extension to the mudguard proper.

When the guards A are of metal or celluloid they can each be conveniently formed in one piece with the spring clips $a^2$ or the latter may be attached as desired. The guards are very simple in attachment simply requiring the clips $a^2$ to be sprung on to the stay and the guards may be turned into desired position. When mounted in this way they may be turned on the stay so as to be adapted for placing in the position shown for use or for turning at right angles to that position when out of use; the grip of the parts $a^2$ upon the stays retaining the guards in desired position.

When the guards are mounted on the stays of a front extension this turning is of particular value as it enables the guards to be turned out of the wind when not required to arrest mud splashing.

The guard illustrated by Fig. 4 is similar to those in Figs. 1, 2 and 3, as regards having both portions $a^1$ and $a^4$, the latter portion of each, however, may be inclined at the edges toward the rear to give a wider protection there. The portion $a^5$ on each guard is provided with tongues $a^6$ which bear against the edge of the ordinary mudguard B to maintain the guards A against accidental turning on the stay. When it is desired to turn the guards these portions $a^6$ are first disengaged.

By Fig. 5 I have shown my pivotal guards attached to a movable stay so that they may be raised and lowered. The stay $b^1$ may be in one piece or the two sides are connected at the back $b^2$ and receive a pin or stud $b^3$ which works in a slot $b^4$ or a series of holes in the mudguard and under the binding action of a suitable nut the stay is secured in desired position. I may use a washer plate preferably inside the guards of a size sufficient to cover the slot or I may use a sliding extension of the guard.

By Fig. 6 I have shown my pivotal auxiliary guards A clipped or clamped on to an adjustable stay $b^1$ attached to the front extension of a mudguard in which a slot $b^4$ is formed. The guards prevent mud being carried up at the side of the front wheel and being blown back on to the rider and when the stay is moved toward the forks of the machine the guards prevent rain beating on the knees of the rider. The auxiliary guards may be carried up above the ordinary guard if desired so long as they are pivotal upon the stay.

Fig. 7 shows a further modification in which the guards are carried across the sides of the wheel; the pivotal side guards A are mounted on a stiff strut or stay $b^1$ and are provided with hinged extensions at the top as at $a^7$ which may form knee protectors and may be readily turned down out of use. The guards preferably have a supporting frame $a^8$ and this is jointed at $a^9$ with a joint having suitable binding or clamping means for setting the joint in desired position. Instead of being hinged the extensions may be detachable and may be secured in any convenient manner such as by screwing into an anchored nut $a^{10}$ as in Fig. 8 or the ends of the frame of the extension may be simply pushed into the tubular stays of the lower part and form a tight fit in same.

The guards A are arranged for turning on the stay $b^1$ when the clips or clamps are released so that after turning down the parts $a^7$ the whole guard may be turned back flat against the side of the forks or side guards.

In any of the examples set forth I may form the side margins of the strips of auxiliary guards with bent down portions for stopping the mud splashing outwardly at the sides.

The arrangement of the auxiliary guards as pivotal structures is of considerable advantage when a machine is placed against the wall, or structure at the side of the wheel, or when stored and on numbers of other occasions; also during riding the guards can be turned edgewise so that no side projections of any kind are left.

What I claim then is:—

1. An auxiliary mudguard for cycles, motor cycles and other vehicles, mounted upon stays, and having means whereby it may be retained parallel to the plane of the wheel or at right angles thereto; substantially as set forth.

2. In a mudguard for cycles, motor cycles, and other vehicles, the combination of a stay, an auxiliary mudguard pivotally mounted upon same, and means whereby the said auxiliary mudguard may be retained in a position at right angles to the plane of the wheel or parallel thereto; substantially as set forth.

3. In a mudguard for cycles, motor cycles, and other vehicles, the combination of a pair of stays substantially radial in respect to the wheel and one on each side of said wheel, auxiliary mudguards pivotally mounted upon same, and means whereby the said auxiliary mudguards may be retained in a position at right angles to the plane of the wheel or parallel thereto; substantially as set forth.

4. In a mudguard for cycles, motor cycles, and other vehicles, the combination of a pair of stays substantially radial in respect to the wheel and one on each side of said wheel, a pair of auxiliary mudguards, spring clips for pivotally mounting said auxiliary mudguards upon said stays, so arranged that the auxiliary mudguards may be turned to and retained in a position at right angles to the plane of the wheel or parallel thereto; substantially as set forth.

5. In a mudguard for cycles, motor cycles, and other vehicles, the combination of a pair of stays substantially radial in respect to the wheel, and one on each side of said wheel, a pair of auxiliary mudguards, spring clips formed by bending over the edges of the mudguard and embracing said stays, so arranged that the auxiliary mudguards may be turned to and retained in a position at right angles to the plane of the wheel or parallel thereto; substantially as set forth.

6. In a mudguard for cycles, motor cycles, and other vehicles, the combination of a wheel, a mudguard partly surrounding the wheel and concentric therewith, a pair of stays mounting said mudguard upon the hub of the wheel, and a pair of auxiliary mudguards pivotally mounted upon said stays, so arranged that the auxiliary mudguards may be turned to and retained in a position at right angles to the plane of the wheel or parallel thereto; substantially as set forth.

In testimony whereof, I have signed my name to this specification in the presence of two subscribing witnesses.

WILLIAM RADCLIFF BIRT, Junior.

Witnesses:
HAROLD J. HONESTER,
NORMAN S. BARLOW.

Copies of this patent may be obtained for five cents each, by addressing the "Commissioner of Patents, Washington, D. C."